United States Patent [19]
Brooks

[11] Patent Number: 5,452,652
[45] Date of Patent: Sep. 26, 1995

[54] APPARATUS FOR REMOVING AND BALING PLASTIC MULCH

[76] Inventor: Thomas W. Brooks, P.O. Box 999, Captiva, Fla. 33924

[21] Appl. No.: 213,688

[22] Filed: Mar. 16, 1994

[51] Int. Cl.$^6$ .................................................. B65B 13/00
[52] U.S. Cl. ...................... 100/7; 47/9; 56/341; 100/91; 100/100; 100/139; 100/180; 100/189
[58] Field of Search ........................... 100/7, 18, 91, 100/100, 138, 139, 180, 187, 189, 250; 47/9 M; 56/341

[56] References Cited

U.S. PATENT DOCUMENTS

| | | | |
|---|---|---|---|
| 506,892 | 10/1893 | Wiebe | 56/341 |
| 1,588,681 | 6/1926 | Haney | 100/189 |
| 2,644,283 | 7/1953 | Rogers et al. | 100/139 |
| 2,775,930 | 1/1957 | Anderson et al. | 100/180 |
| 3,181,455 | 5/1965 | Gouker et al. | 100/97 |
| 3,625,374 | 1/1970 | Hemphill | 100/189 |
| 4,796,711 | 1/1989 | Chrysler | 47/9 M |
| 5,235,798 | 8/1993 | Giardina et al. | 56/16.6 |
| 5,336,036 | 8/1994 | Williamson et al. | 100/250 |

FOREIGN PATENT DOCUMENTS

| | | | |
|---|---|---|---|
| 2528660 | 12/1983 | France | 100/189 |
| 1045263 | 10/1966 | United Kingdom | 100/139 |

*Primary Examiner*—Stephen F. Gerrity
*Attorney, Agent, or Firm*—Bell, Seltzer, Park & Gibson

[57] ABSTRACT

An apparatus for removing and baling plastic webs from agricultural fields including a carriage, a conveyer for receiving and conveying a plurality of plastic webs with sufficient force to remove the webs from the ground, a guide for guiding the webs to the conveyer while removing substantial amounts of dirt and debris therefrom, a hopper for receiving the plastic webs from the conveyer, a baler for compacting the plastic webs into bales, and an hydraulic drive for driving the conveyer and the baler.

14 Claims, 5 Drawing Sheets

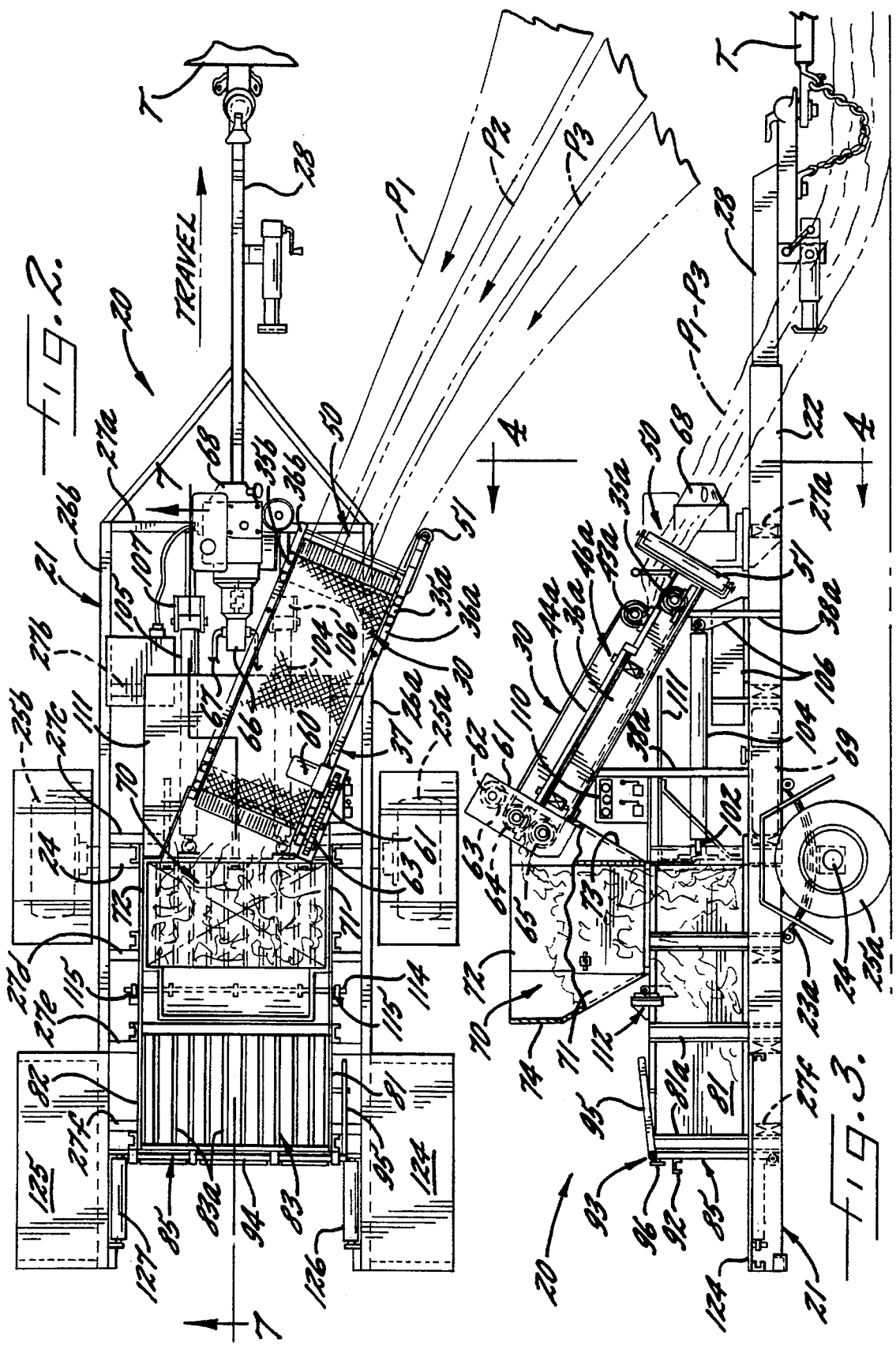

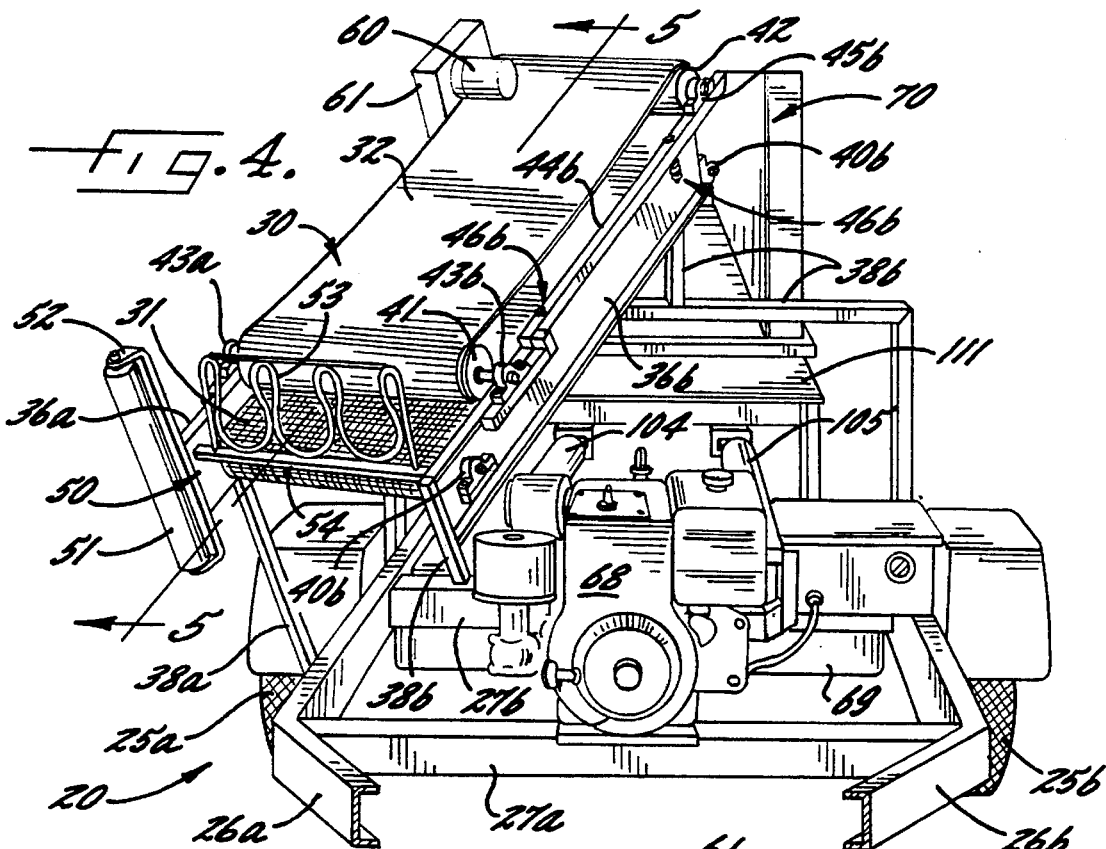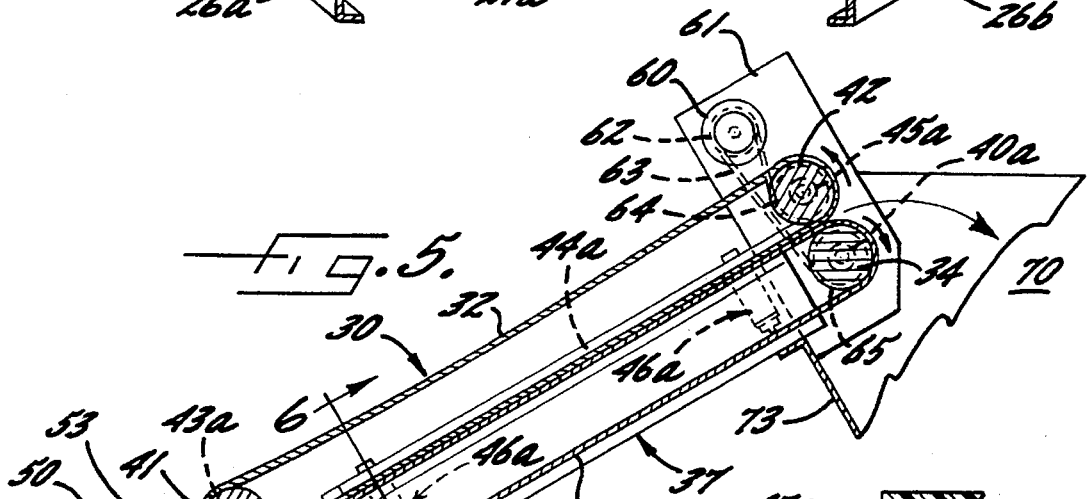

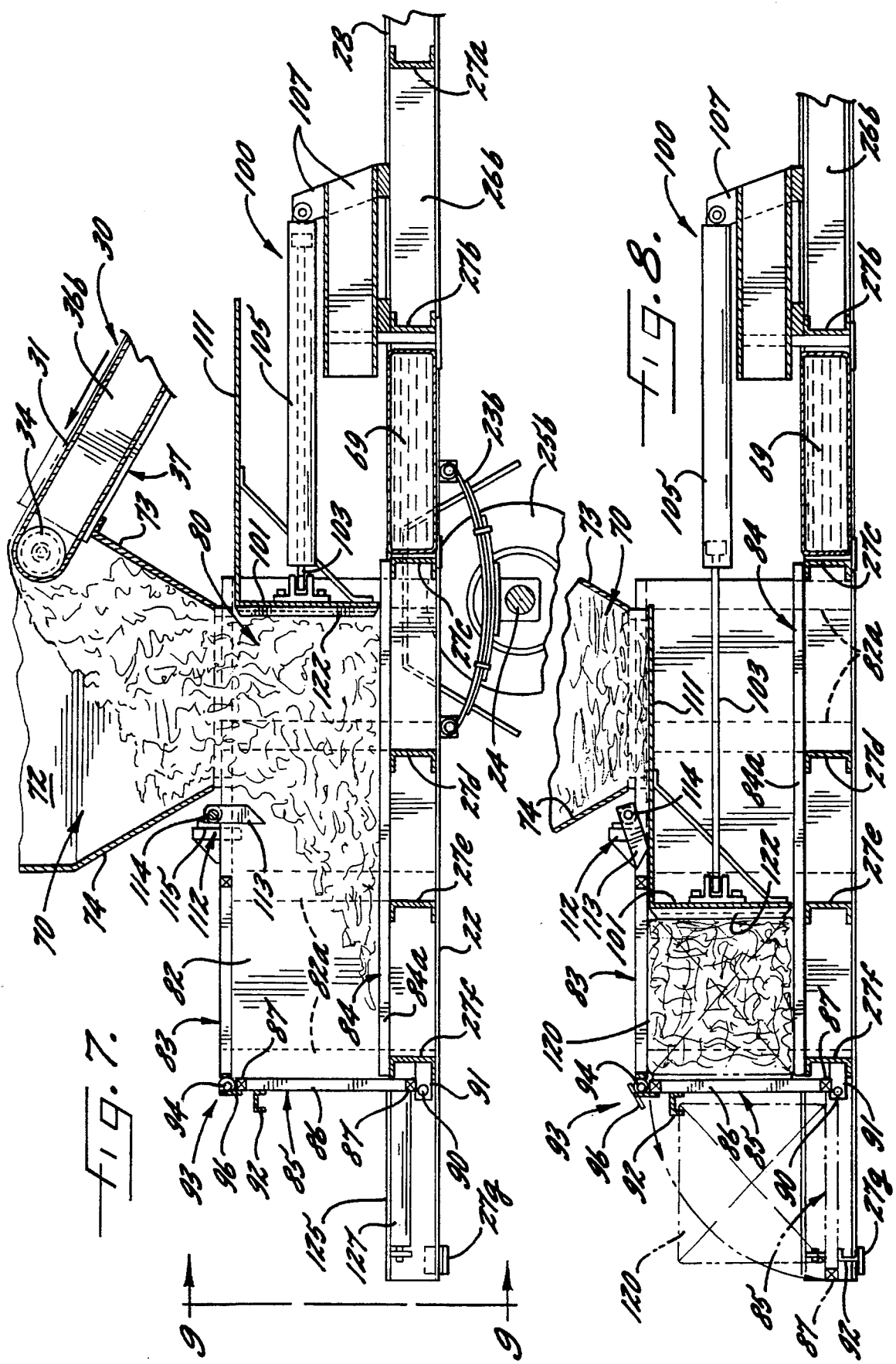

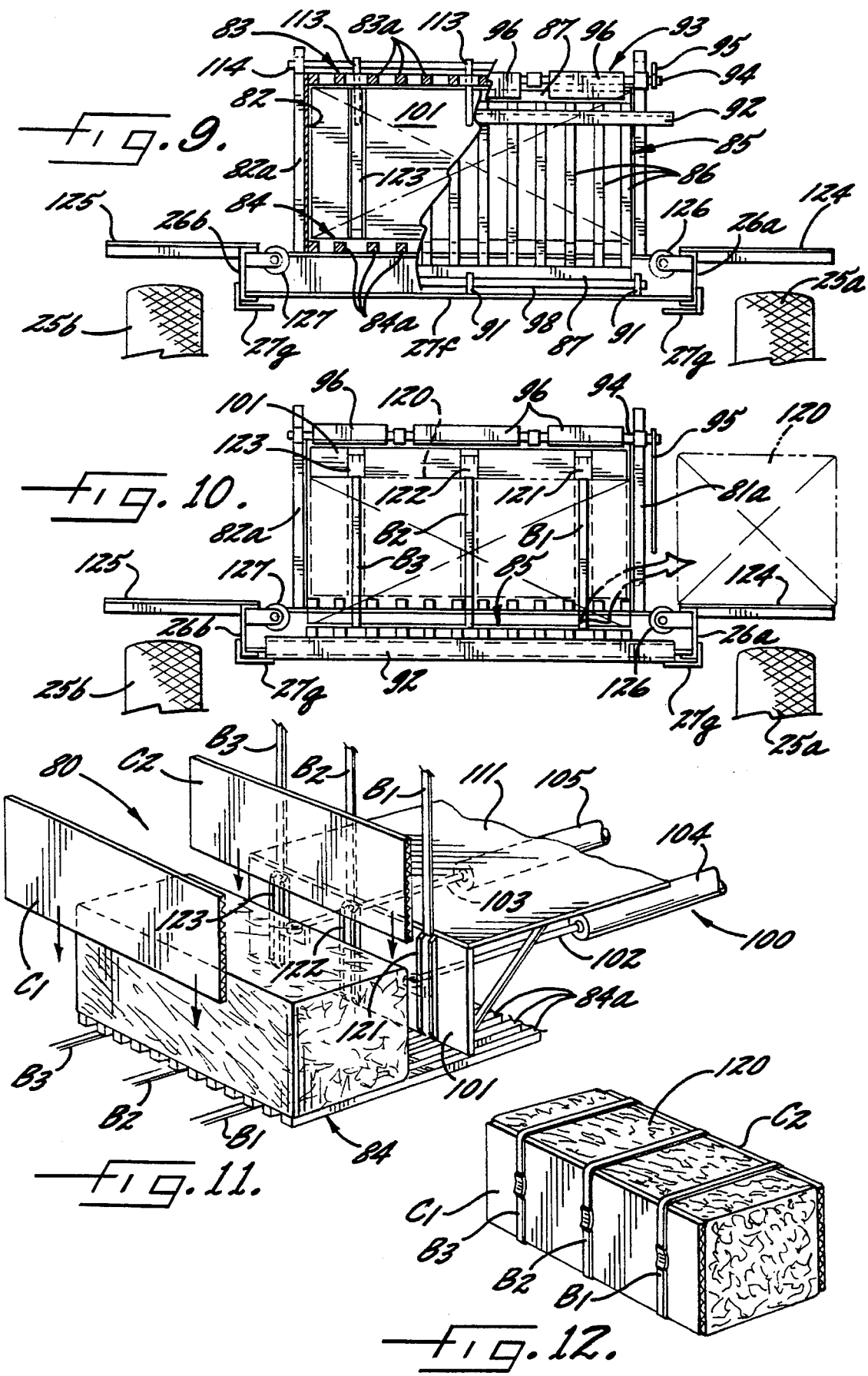

APPARATUS FOR REMOVING AND BALING PLASTIC MULCH

FIELD OF THE INVENTION

This invention relates to agricultural equipment and more particularly to an apparatus for removing and baling plastic webs used as mulch in agricultural fields.

BACKGROUND OF THE INVENTION

It is very common in many agricultural fields and with many different agricultural crops, such as vegetables, to use plastic webs as mulch covering the rows or seed beds. The plastic webs preserve moisture, inhibit weed growth and permit fumigation of the soil.

The rows or seed beds are prepared to have a planting surface above the level of the ground between the rows. The raised beds are covered by a web of plastic and the opposite side edges of the plastic web are held down by a small amount of soil placed thereon. The crop is planted in the rows or seed beds by punching or cutting holes in the plastic web at spaced intervals and setting plants or seedlings in the seed beds through such holes.

The plastic webs inhibit weed growth and conserve moisture. In addition, the crops may be irrigated by percolating water from below into the seed beds, with such percolation being assisted by the plastic webs. A plastic web generally can be used for two successive crops and sometimes even more before it must be removed and replaced.

Currently, the only effective method of removal of such plastic webs is manually by pulling the individual webs from each seed bed and rolling the same into a large, relatively loose roll. The handling, hauling and disposal of such rolls of plastic web is laborious, time consuming and extremely difficult. In addition, disposal of such plastic rolls is by deposit in landfills which charge by volume and therefore such disposal is very expensive.

It has been previously proposed in U.S. Pat. No. 3,181,455 to mechanize the removal and collection of very large pliofilm sheeting used in disinfecting or fumigating fields prior to planting. To the best of our knowledge, this prior proposal was never actually commercially available and, even if it had been available, would not have been successful because of readily ascertainable deficiencies and disadvantages presented by the apparatus disclosed therein.

Foremost among these deficiencies and disadvantages was the drive mechanism for the apparatus. All of the operating instrumentalities were driven by the wheels supporting the apparatus for movement over the ground. Because of this drive arrangement, a large tractor or other towing vehicle was required to move the apparatus over the ground and to provide the driving force for the various instrumentalities thereof.

Another deficiency was the feed rolls which removed the plastic sheeting from the ground and fed the same to the compaction mechanism. A single pair of feed rolls cannot provide the feeding force required to remove the plastic from the ground and to feed the same to the compaction mechanism while accommodating the irregularities in the thickness of the plastic which invariably occurs.

SUMMARY OF THE INVENTION

With the foregoing in mind, it is an object of the present invention to provide an apparatus for removing and baling plastic webs in which the deficiencies and disadvantages heretofore encountered are overcome.

This object of the present invention is accomplished by an apparatus including a chassis supported by freely rotatable wheels so that the apparatus may be easily towed by a small tractor or truck. The apparatus includes a feeding means for removing the plastic webs from the ground and feeding them into a hopper, which feeding means comprises a pair of conveyor belts providing the necessary pulling and feeding force while accommodating irregularities in thickness of the plastic webs. Additionally, web guiding means and the conveyor belts are constructed and arranged to remove, to a substantial extent, dirt and other debris from the plastic webs. A baling means is provided for compressing the plastic webs into bale form which may then be tied or secured in compressed form. Finally, hydraulic drive means is provided for driving the conveyor belts and for operating the baling means in a simple and efficient manner.

BRIEF DESCRIPTION OF THE DRAWINGS

Some of the objects and advantages of the present invention having been stated, others will appear as the description proceeds when considered in conjunction with the accompanying schematic drawings, in which:

FIG. 2 is an enlarged plan view of the apparatus shown in FIG. 1;

FIG. 3 is a side elevation of the apparatus shown in FIG. 2;

FIG. 4 is a vertical sectional view taken substantially along line 4—4 in FIG. 3;

FIG. 5 is a fragmentary enlarged vertical section view taken substantially along line 5—5 in FIG. 4;

FIG. 6 is a fragmentary enlarged sectional view taken substantially along line 6—6 in FIG. 5;

FIG. 7 is an enlarged fragmentary vertical sectional view taken substantially along line 7—7 in FIG. 2;

FIG. 8 is a fragmentary sectional view similar to FIG. 7 illustrating the baling means in another operative position;

FIG. 9 is a fragmentary end elevational view taken substantially along line 9—9 in FIG. 7 with portions broken away for clarity;

FIG. 10 is a view similar to FIG. 9 illustrating discharge to a storage platform of a bale of plastic web;

FIG. 11 is a fragmentary perspective view illustrating one step in the baling process; and FIG. 12 is a perspective view of a completed bale.

DETAILED DESCRIPTION OF THE PREFERRED EMBODIMENT

Figure 1:
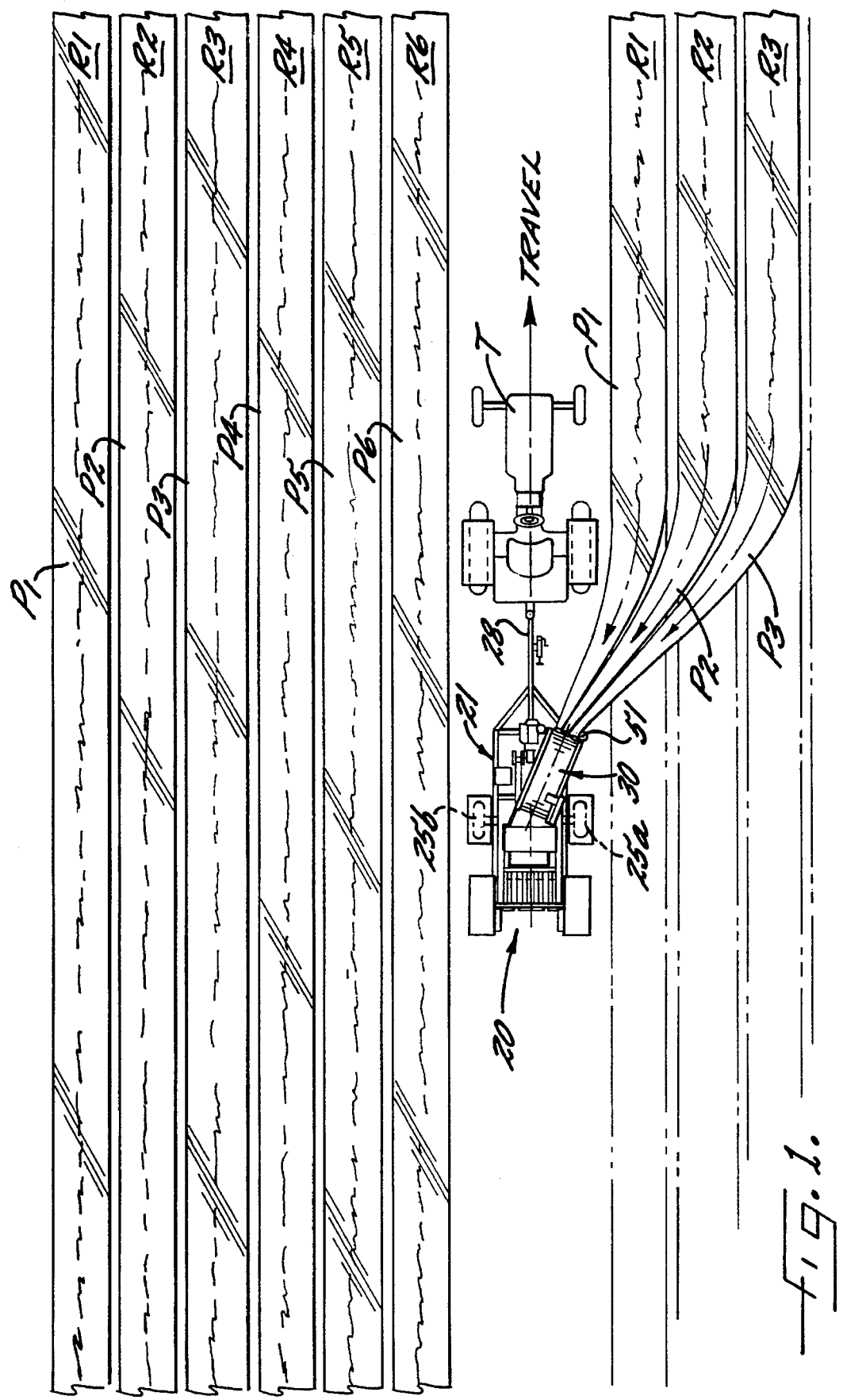
FIG. 1 is a plan view illustrating an apparatus incorporating the features of the present invention in use.

Referring now more specifically to the drawings, there is illustrated therein an apparatus, generally indicated at 20, for removing and baling plastic webs from agricultural fields where such webs have been used as mulch. Apparatus 20 includes a chassis 21 having a frame 22 supported by springs 23a, 23b on an axle 24 which in turn is supported by a pair of wheels 25a, 25b. Frame 22 has a pair of longitudinal side frame members 26a, 26b and a plurality of transverse frame members 27a–g, inclusive, interconnected into a rigid structure. A tongue 28 extends forwardly from the front of the frame 22 to permit apparatus 20 to be towed by a small tractor T or similar towing vehicle (FIG. 1).

Apparatus 20 includes plastic web feeding means 30 for removing one or more plastic webs P from the planting rows $R_1$–$R_6$ as the apparatus 20 moves across the agricultural field and for feeding the plastic webs P into a plastic web baling means 80. The feeding means 30 includes a pair of conveyor belts 31, 32 which cooperate with each other to securely grip the plastic webs therebetween.

The lower conveyor belt 31 is trained about rolls 33, 34 at its opposite ends (FIG. 5). Roll 33 is an idler roll and is journaled at its opposite ends in bearings 35a, 35b mounted on side rails 36a, 36b of a conveyor frame 37. Conveyor frame 37 is supported on side rails 26a, 26b by stanchions 38a, 38b.

The roll 34 is a drive roll that is journaled for rotation in bearings 40a, 40b carried by side rails 36a, 36b, respectively and is driven in a manner to be described hereinafter. Preferably, lower conveyor belt 31 is foraminous to permit dirt and small debris to pass therethrough (FIG. 4).

Upper conveyor belt 32 is trained about rolls 41, 42 at its opposite ends. Preferably, upper belt 32 is shorter than lower belt 31 so that roll 41 is spaced from roll 33 so that the lower end of lower belt 31 engages and supports the plastic webs before they enter between belts 31 and 32.

Roll 41 is an idler roll that is journaled for free rotation in bearings 43a, 43b carried by side rails 44a, 44b (FIG. 4). Roll 42 is a drive roll journaled for rotation in bearings 45a, 45b mounted on side rails 44a, 44b. Roll 42 is driven in a manner hereinafter described.

Upper conveyor belt side rails 44a, 44b are mounted on conveyor frame side rails 36a, 36b, respectively, for vertical adjustable movement by mounting means 46a, 46b. Mounting means 47a, 47b include bolts 47a, 47b which are slidably received in holes in side rails 36a, 36b and each of which have a head at one end and a nut and washer at the other end. Springs 48a, 48b surround the bolts 47a, 47b and engage the underside of the upper flange of side rails 36a, 36b at one end and the washers on the bolts 47a, 47b at their other ends. The upper conveyor belt 32 is thusly spring biased toward lower conveyor belt 31 to accommodate varying thickness of the plastic webs while firmly gripping the plastic webs to generate sufficient pulling force to remove a plurality of such webs from the seed beds. In this regard, upper conveyor belt 32 preferably has a ribbed or otherwise roughened surface to increase the gripping force applied to the plastic webs.

Guide means 50 is provided on the outer end of the conveyor frame 37 for guiding the plastic webs from the seed beds to the conveyor belts 31, 32. Guide means 50 includes a roller guide 51 journaled for free rotation at its opposite ends in a U-shaped support bracket 52 (FIG. 4 and 5). Bracket 52 is mounted on the outer end of side rail 36a. Guide means 50 further includes a stationary guide 53 having a plurality of guiding openings therethrough. Stationary guide 53 is mounted on a cross bar 54 which in turn is mounted at its opposite ends on side rails 36a, 36b. In addition to guiding the plastic webs to the conveyor belts 31, 32, guide means 50 scrapes or otherwise dislodges a considerable amount of dirt and other debris from the plastic webs.

Conveyor belts 31, 32 are driven by an hydraulic motor 60 which is mounted on a housing 61 carried by the upper end of side rail 36a. Interiorly of housing 61, motor 60 has a drive sprocket 62 on the shaft thereof and about which one end of a sprocket chain 63 is entrained. Sprocket chain 63 drives sprockets 64, 65 mounted on rolls 42, 34, respectively.

Hydraulic motor 60 is supplied with hydraulic fluid under pressure by a pump 66 connected thereto by suitable hoses 67 (FIG. 2). Pump 66 is driven by an internal combustion engine 68. A reservoir 69 of hydraulic fluid is carried by cross frame members 27b and 27c and is connected to pump 66 by suitable hoses (not shown).

A hopper 70 of sheet metal is mounted on the top of baling means 80. Hopper 70 includes a pair of substantially vertical side walls 71, 72, a front wall 73 which supports the upper, discharge end of conveyor means 30 and slopes downwardly and rearwardly therefrom, and a rear wall 74 which has a vertical portion at the top thereof and a downwardly and forwardly sloping portion at the bottom thereof. The bottom of hopper 70 is open and communicates with the interior of baling means 80.

Baling means 80 includes a pair of side walls 81, 82 carried by chassis frame 22 and extending from a forward end thereof just in front of the hopper 70 to a discharge end spaced substantially rearwardly of the hopper 70. Preferably, side walls 81, 82 are constructed of sheet metal reinforced by upstanding posts 81a, 82a. A top wall 83 extends rearwardly from the rear wall 74 of the hopper 70 to the discharge end of the baling means 80. Similarly, a bottom wall 84 extends from the forward ends of the side walls 81, 82 to the discharge end of the baling means 80. Preferably, top and bottom walls 83, 84 are formed of a plurality of spaced apart, parallel bars 83a, 84a. The top and bottom walls 83, 84 are connected to the side walls 81, 82 to form a compaction chamber communicating with the hopper 70 at its forward end and terminating in a bale discharge opening at its rearward end.

The bale discharge opening of baling means 80 is selectively opened and closed by a gate 85. Gate 85 is formed of a plurality of spaced apart, parallel bars 86 connected at their opposite ends by cross bars 87. Gate 85 is mounted for pivotal movement between a vertical or closed position and a horizontal or open position by a shaft 90 mounted on the lower end of gate 85 and brackets 91 mounted on cross frame member 27f and having holes therein through which shaft 90 extends. (FIGS. 7 and 9).

A rest member 92 is mounted on vertical bars 86 in a position to support the upper end of gate 85 on cross frame member 27g when gate 85 is in the horizontal or open position (FIG. 8). A latching means 93 is provided on top wall 83 above gate 85 to latch gate 85 in the vertical or closed position. Latching means 93 includes a shaft 94 rotatably mounted on top wall 83 and having a handle 95 mounted on one end thereof. Latch plates 96 are carried by shaft 94 and are adapted to engage the rear surface of upper cross bar 87 of gate 85 when latching means 93 is in latched position and to be spaced above upper cross bar 87 of gate 85 when latching means 93 is in the unlatched position (FIG. 8).

Compaction means 100 is provided for compacting the plastic webs in the baling means 80. Compaction means 100 includes a ram 101 mounted vertically within the compaction chamber defined by side walls 81, 82 and top and bottom walls 83, 84 and having a width and height substantially the same as the width and height of that chamber. Ram 101 is carried by the outer ends of piston rods 102, 103 of two hydraulic cylinders 104, 105. Hydraulic cylinders 104, 105 are mounted on stanchions 106, 107 that are in turn mounted on the chassis frame 22 (FIGS. 2, 7 and 8).

Hydraulic cylinders 104, 105 are connected to pump 66 through a controller 110 (FIG. 3). Controller 110 includes suitable control valves and a timing mechanism (not shown)

that is well know to those skilled in the art of hydraulics. Controller 110 controls the hydraulic cylinders 104, 105 to operate ram 101 between an inactive forward position in which ram 101 is positioned forwardly of the open bottom of hopper 70 and an active rearward position in which ram 101 is positioned rearwardly of the hopper 70 near the gate 85.

A hopper closure plate 111 is carried by ram 101 at its rearward end and extends forwardly thereof to a free forward end. Closure plate has a length at least as great as the stroke of ram 101 and is moved with ram 101 to close the open bottom of hopper 70 on the compaction and retraction strokes of ram 101.

Retaining means 112 is provided for retaining the compacted plastic webs in the compacted state upon retraction of ram 101. Retaining means 112 includes a plurality of retaining fingers 113 mounted for pivotal movement on a shaft 114 which is journaled for rotation in suitable bearings 115. Bearings 115 are mounted on top wall 83 rearward of hopper 70 but forwardly of the rearward position of ram 101 (FIGS. 7 and 8).

Retaining fingers 113 normally occupy the position shown in FIG. 7 in which they extend downwardly into the compaction chamber and in the path of ram 101. In this position, the rear surface of fingers 113 will engage the front surface of the compacted mass of plastic webs and retain that compacted mass in the compacted state to prevent the compacted mass from expanding forwardly on the retraction stroke of ram 101 and closing the open bottom of hopper 70.

To complete the baling process, the compacted mass of plastic webs is banded into a bale 120 (FIG. 12). The rear face of ram 101 is provided with three vertical channels 121, 122, 123 (FIG. 11) to guide three bands $B_1$, $B_2$ and $B_3$ into position in front of the compacted mass of plastic webs. If desired, a corrugated cardboard spacer $C_1$, may be inserted into the rear end of the compaction space at the time gate 85 is closed. Another cardboard spacer $C_2$ may be inserted in front of the compacted mass through hopper 70. Spacer $C_2$ will then be pushed rearwardly against the compacted mass by ram 101.

The bands $B_1$, $B_2$ and $B_3$ are inserted downwardly through spaces between the bars 83a forming top wall 83 and along channels 121, 122 and 123 and through spaces between the bars 84a forming bottom wall 84. The bands are then pulled along the spaces between the bars 83a and 84a and the ends are brought together in the spaces between the bars 86 of gate 85. The overlapped ends of bands $B_1$, and $B_2$ and $B_3$ are secured together by clips in the normal manner. The bale 120 is then ready to be removed and stored for later disposal.

Storage racks 124, 125 are provided on opposite sides of the rear end of the baling means 80 for temporary storage of completed bales 120 (FIGS. 2, 9 and 10). Rollers 126, 127 are mounted on the inside of storage racks 124, 125 to assist in moving bales 126 from the gate 85 onto the storage racks 124, 125.

The operation of the apparatus 20 will now be described in connection with a typical agricultural field in which row crops are normally grown. As shown in FIG. 1, such an agricultural field typically will have the rows R arranged in groups with six rows $R_1$–$R_6$ to the group. Adjacent groups of rows are separated by an access space sufficiently wide for service equipment, such as tractors and trailers, to pass unimpeded therealong. Each row R consists of a seed bed that is mounded above the access space and the spaces between rows and each seed bed of each of the rows $R_1$–$R_6$ is covered by a plastic web $P_1$–$P_6$.

The longitudinal edges of the plastic webs $P_1$–$P_6$ are usually weighted down with soil placed on top thereof. Holes are then formed along the center of the plastic webs and seedlings are planted in the seed beds through these holes and project upwardly therethrough. Usually, a plurality of crops, typically two, are grown before the plastic webs $P_1$–$P_6$ are removed, the seed beds are tilled and reformed and new plastic webs are applied.

When the plastic webs $P_1$–$P_6$ are to be removed, the apparatus 20 is towed along the access space between two groups of rows by a small tractor T, pick-up truck or the like. From one to three plastic webs $P_1$–$P_3$ are started manually by having one end thereof picked-up from one end of the row, bunched together, threaded through one of the spaces in guide 53 and placed between the conveyor belts 31 and 32. This start-up procedure is repeated for each additional plastic web up to three that is to be removed during each pass of the apparatus 20.

The towing vehicle is started moving slowly along the access space toward the opposite ends of the rows and the conveyor means 30 is activated by opening the valve (not shown) between hydraulic pump 66 and hydraulic motor 60. The speed of forward travel of the apparatus 20 is correlated to the feeding rate of conveyor means 30 such that the plastic webs P are removed without undue stretching or tearing, but with sufficient tensile force to aid in removing dirt and other debris therefrom. The roller 51 guides the plastic webs P to the guide means 53 and cooperates with guide means 53 and conveyor belts 31 and 32 in removing dirt and other debris from the plastic webs. The removal of such dirt and debris is important because disposal facilities charge disposal fees based on both weight and volume.

Conveyor means 30 feeds the plastic webs P into hopper 70 and the plastic webs P fall through the open bottom thereof into the baling means 80. Ram 101 is operated by the hydraulic cylinders 104, 105 on a timed basis to cycle through its compaction and retraction strokes. On a compaction stroke, the ram 101 is moved rearwardly to compact the plastic webs P against the gate 85 which is in the vertical and latched position and engages and pivots upwardly the retaining fingers 113. The closure plate 111 closes the open bottom of hopper 70 and the plastic webs P fed into hopper 70 by conveyor means 30 collect on the closure plate 111 until ram 101 is retracted. Upon retraction of ram 101, the retaining fingers 113 pivot downwardly and the compacted mass of plastic webs is retained in the rear portion of the baling means 80 by the retaining fingers 113.

This process is continued until a sufficient amount of the plastic webs P has been compacted to form a bale 120. At that time, forward motion of the apparatus 20 is terminated and conveyor means 30 is stopped. The plastic webs $P_1$–$P_3$ are severed at the discharge end of conveyor means 30 and ram 101 is activated to compact the remainder of the plastic webs into the rear end of baling means 80 and then retracted.

While not necessary, but may be considered desirable, corrugated paperboard spacers $C_1$ and $C_2$ may be used on the front and rear of the bale 120. If such spacers are used, the rear spacer $C_1$ would have been inserted in front of gate 85 when the gate was raised to the vertical and latched position, and the front spacer $C_2$ is now inserted through the open bottom of hopper 70 and ram 101 is activated to move the front spacer $C_2$ rearwardly into contact with the bale 120. If no spacers are used, ram 101 would not be retracted from its last compaction stroke until banding has been accomplished. A plurality of bands, preferably three, $B_1$–$B_3$ are inserted around bale 120, and the spacers, if any are used, and the ends thereof are secured together by clips. Ram 101 is then retracted to the inactive position.

Gate 85 is unlatched by rotating handle 95 forwardly and downwardly. Gate 85 is then lowered to the horizontal position with the rest 92 on top of frame member 27g. In this position, it is noted that gate 85 is below the level of bottom wall 84 so that bale 120 may be easily pulled from the rear end of baling means 80 and will drop down a short distance onto the gate 85. Bale 120 may then be moved with the assistance of roller 126 or 127 onto storage rack 124 or 125 for temporary storage.

Gate 85 is then moved upwardly to the vertical position, with or without a spacer, and latched. Forward movement of the apparatus 20 and operation of conveyor means 30 and ram 101 is again commenced until another bale is formed.

In the drawings and specification, there has been set forth a preferred embodiment of the invention, and although specific terms are employed, they are used in a generic and descriptive sense only and not for purposes of limitation.

What is claimed is:

1. Apparatus for removing and baling plastic webs from agricultural fields while reducing the amount of dirt and debris removed with the plastic webs, said apparatus comprising a carriage adapted for movement over an agricultural field adjacent plastic web covered rows therein, conveyor means carried by said carriage for receiving at least one plastic web in one end thereof and for conveying the plastic web through and out of the other end thereof, guide means carried by said carriage adjacent said one end of said conveyor means for guiding the plastic web into said one end of said conveyor means, hopper means carried by said carriage below said other end of said conveyor means for receiving the plastic web from said conveyor means, baling means carried by said carriage below said hopper means for receiving plastic web from said hopper means and for compressing the plastic web into a dense bale, and hydraulic drive means for driving said conveyor means and said baling means in timed relation.

2. Apparatus according to claim 1 wherein said conveyor means comprises a pair of conveyor belts providing substantial plastic web gripping surfaces for feeding the plastic web with the force required to remove the web from the row and to deposit the same in said hopper means.

3. Apparatus according to claim 2 wherein said conveyor belts comprise a bottom belt and a top belt and said top belt is mounted for limited vertical movement relative to said bottom belt and is spring biased toward said bottom belt.

4. Apparatus according to claim 3 wherein said top conveyor belt is shorter than said bottom conveyor belt to provide for easy threading of plastic web therebetween.

5. Apparatus according to claim 3 wherein said bottom belt is foraminous to permit dirt to fall therebetween.

6. Apparatus according to claim 3 wherein said drive means for said conveyor means comprises an hydraulic motor drivingly connected to said conveyor belts and means for supplying hydraulic fluid under pressure to said hydraulic motor.

7. Apparatus according to claim 1 wherein said guide means comprises a stationary guide mounted adjacent the inlet end of said conveyor means and having at least one guide opening therethrough.

8. Apparatus according to claim 7 wherein said stationary guide has a plurality of guide openings therethrough for guiding a plurality of plastic webs in side-by-side relation to said conveyor means.

9. Apparatus according to claim 7 wherein said guide means also includes a roller guide mounted forwardly of said stationary guide for guiding the plastic web to said stationary guide.

10. Apparatus according to claim 1 wherein said baling means comprises means defining a compaction chamber communicating with said hopper means for receiving plastic web therefrom and compaction means in said compaction chamber for compacting the plastic webs therein.

11. Apparatus according to claim 10 wherein said compaction means comprises a ram and hydraulic cylinders for moving said ram through compaction and retraction strokes.

12. Apparatus according to claim 11 wherein said compaction means includes hopper closure means for closing said hopper means during the compaction and retraction strokes of said ram.

13. Apparatus according to claim 11 wherein said compaction means includes retaining means in said compaction chamber for retaining the compacted plastic webs in the compacted state upon retraction of said ram.

14. Apparatus according to claim 10 wherein said compaction means includes means facilitating the banding of bales when fully formed.

* * * * *